United States Patent
Puranik et al.

(10) Patent No.: US 10,067,842 B2
(45) Date of Patent: Sep. 4, 2018

(54) CABLE REPLACEMENT IN A SYMMETRIC MULTIPROCESSING SYSTEM

(71) Applicant: International Business Machines Corporation, Armonk, NY (US)

(72) Inventors: Santosh S. Puranik, Bangalore (IN); Venkatesh Sainath, Bangalore (IN); Jinu J. Thomas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 14/955,321

(22) Filed: Dec. 1, 2015

(65) Prior Publication Data

US 2017/0153953 A1 Jun. 1, 2017

(51) Int. Cl.
*H04J 1/16* (2006.01)
*G06F 11/20* (2006.01)
*G06F 9/455* (2018.01)

(52) U.S. Cl.
CPC ...... *G06F 11/2017* (2013.01); *G06F 9/45533* (2013.01); *G06F 2201/805* (2013.01); *G06F 2201/85* (2013.01)

(58) Field of Classification Search
CPC ............. G06F 11/2017; G06F 9/45533; G06F 2201/805; G06F 2201/85
USPC ......................................................... 370/241
See application file for complete search history.

(56) References Cited

U.S. PATENT DOCUMENTS

| | | | |
|---|---|---|---|
| 6,640,272 B1 | 10/2003 | Hartwell et al. | |
| 8,488,472 B2* | 7/2013 | Morris | H04L 41/12 370/240 |
| 2011/0283028 A1* | 11/2011 | Byers | G06F 13/4022 710/107 |
| 2011/0307734 A1* | 12/2011 | Boesen | G06F 8/31 714/3 |
| 2013/0133061 A1* | 5/2013 | Fainkichen | C09J 7/041 726/15 |

* cited by examiner

*Primary Examiner* — Peter Cheng
(74) *Attorney, Agent, or Firm* — Nicholas D. Bowman

(57) ABSTRACT

Data communication between nodes of a symmetric multi-processing (SMP) computing system can be maintained during the replacement of a faulty cable used to interconnect the nodes. A data bus error caused by the faulty cable is detected, resulting in the activation of an alternative data path between the nodes, and the disabling of a data path through the faulty cable. A system notification indicating the faulty cable is issued, and in response to the nodes being interconnected with a replacement cable, the replacement cable is tested for reliability. After the replacement cable is determined to be reliable, a data path through the replacement cable is activated.

20 Claims, 3 Drawing Sheets

CABLE REPLACEMENT IN A SYMMETRIC MULTIPROCESSING SYSTEM

BACKGROUND

The present disclosure generally relates to interconnections between compute nodes of a symmetric multiprocessing (SMP) system. In particular, this disclosure relates to maintaining data flow between two computing nodes while replacing a faulty cable connected between the nodes.

An SMP system is a tightly coupled computing system having a pool of two or more homogeneous processors that share a centralized "main memory" (MM), and operate under a single operating system. In an SMP system, the pool of homogeneous processors can each run independently, each processor executing different programs and working on different data, and having access to shared system resources, including memory, input/output (I/O) devices, and interrupt systems. The homogeneous processors can be interconnected using a system bus or a crossbar switch. Each processor can have an associated, private, high-speed cache memory to accelerate the MM data access and to reduce the system bus traffic.

SUMMARY

Embodiments may be directed towards a method. The method may include identifying as defective, a first cable, the first cable including a first data path between a first compute node of a symmetric multiprocessing (SMP) system and a second compute node of the SMP system. The method may also include routing, in response to the identifying, pending data transfers associated with the first data path to an alternate data path between the first compute node and the second compute node. The method may also include disabling a first portion of the first compute node and a second portion of the second compute node, the first and second portions each in communication with the first cable, the disabling preventing future data transfers across the first data path. The method may also include generating a system alert, the system alert including an indication of the first cable as defective and verifying, by testing, reliability of a second data path of a second cable, in response to the second cable being installed between the first compute node and the second compute node. The method may also include enabling, in response to the verified reliability of the second data path, future data transfers across the second data path, by enabling the first portion of the first compute node and the second portion of the second compute node.

Embodiments may also be directed towards an SMP system. The SMP system may include a first compute node having a first portion configured to connect to, and transfer data over, a first cable and a second compute node having a second portion configured to connect to, and transfer data over, the first cable. The SMP system may include the first cable, the first cable including a first data path and a second cable, the second cable including a second data path and at least one processor circuit. The at least one processor circuit may be configured to identify as defective, the first cable, the first cable including the first data path between the first compute node and the second compute node. The at least one processor circuit may also be configured to route, in response to the identifying, pending data transfers associated with the first data path to an alternate data path between the first compute node and the second compute node. The at least one processor circuit may also be configured to disable the first portion of the first compute node and the second portion of the second compute node, the first and second portions each in communication with the first cable, the disabling preventing future data transfers across the first data path. The at least one processor circuit may also be configured to generate a system alert, the system alert including an indication of the first cable as defective and verify, by testing, reliability of the second data path of the second cable, in response to the second cable being installed between the first compute node and the second compute node. The at least one processor circuit may also be configured to enable, in response to the verified reliability of the second data path, future data transfers across the second data path, by enabling the first portion of the first compute node and the second portion of the second compute node.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
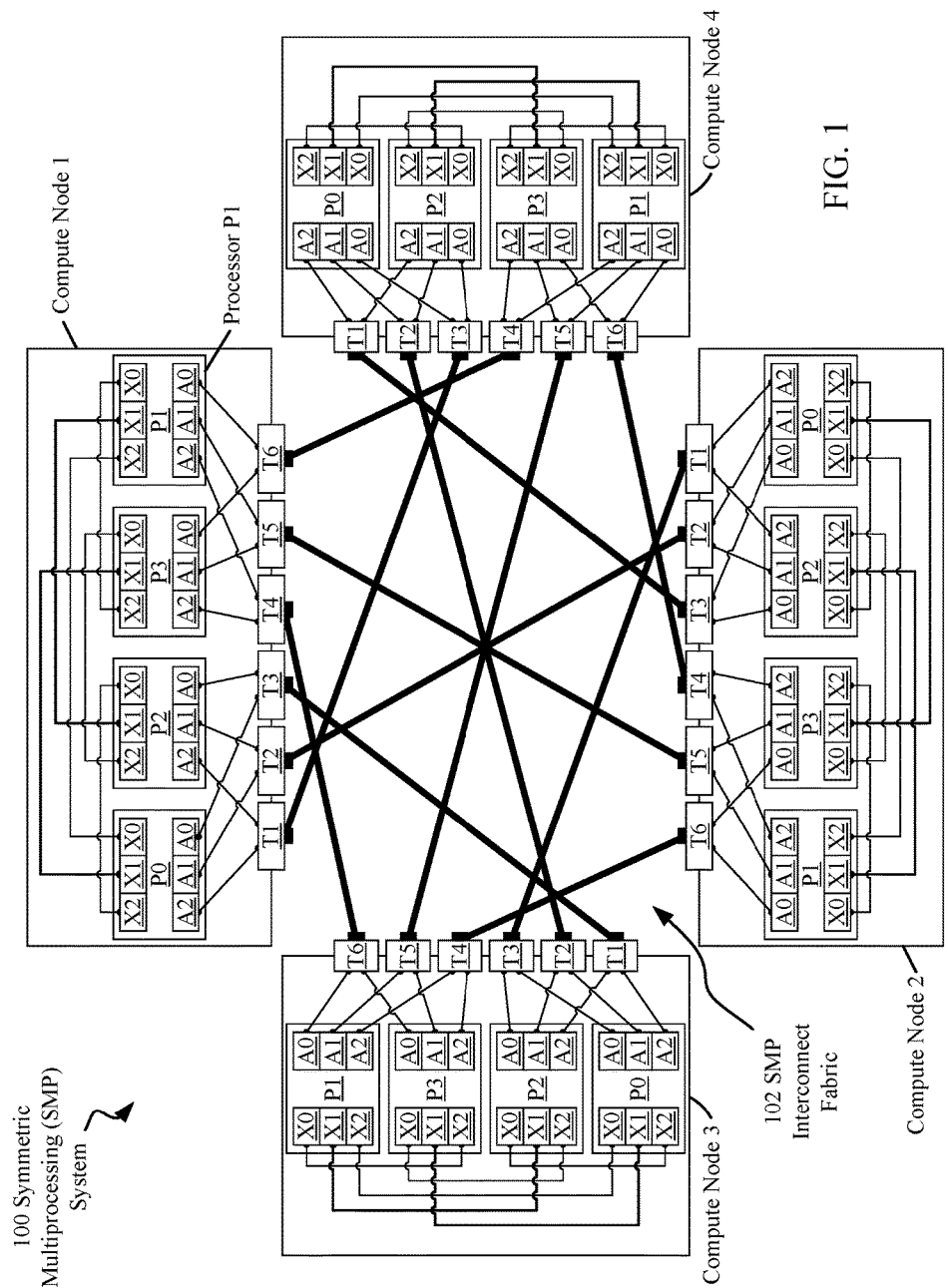
FIG. 1 is a block diagram depicting interconnections between nodes of a symmetric multiprocessing (SMP) system, according to embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing robust continuity of computing node interconnection, during the replacement of an interconnecting cable, for electronic computing systems such as symmetric multiprocessing (SMP) systems. SMP systems can be used to provide a tightly-coupled multiprocessing computing platform on which multithreaded software applications can be run. Such applications may include, but are not limited to, commercial data and online transaction processing (OLTP), cryptography, engineering and scientific modeling and simulation, graphics and video processing, editing and conversion, time-sharing and server-based applications. While not necessarily limited thereto, embodiments discussed in this context can facilitate an understanding of various aspects of the disclosure. Certain embodiments may also be directed towards other equipment and associated applications, such as providing robust continuity of computing node interconnection for other types of multiprocessing computing systems such as rack-mounted servers, supercomputers, high-performance computers (HPCs), and special-purpose computing systems. Such systems may be used in a wide variety of computational and data processing applications. Such computing systems may feature highly interconnected processors and/or nodes, and may leverage the high degree of interconnection between processors in order to provide high computational throughput.

An SMP system is a computing system that includes multiple, homogeneous processors that are highly interconnected to each other and to common system resources such as memory, input/output (I/O) devices, and interrupt systems. The processors within an SMP system can be organized in groups known as "nodes", with each node of the SMP system having a consistent, symmetric, organization of processors and local interconnect buses between the processors. In some SMP systems, each node may be an individual, replaceable physical unit or "drawer", which can be installed within a cabinet or rack-mount system. The nodes of an SMP system are generally designed to be highly interconnected by a set of cables, with each cable suitable for the transmission of data traffic from a processor located within one node to another processor located within another node of the SMP system. The enhanced data bandwidth and computational efficiency an SMP system can provide is highly dependent upon the large number of symmetrically arranged processor-to-processor interconnections, i.e., cables.

The cables used for node-to-node interconnections within an SMP system can fail for a variety of reasons. For example, an interconnect cable failure can result from an electrically shorted, open or intermittent cable connection, and such a failure can significantly reduce or halt data traffic between interconnected SMP nodes. A single defective or failed interconnect cable within an SMP system can significantly reduce the bandwidth and computational efficiency of the pair of processors that it interconnects, and of the entire SMP system. Replacement of the faulty interconnect cable may be necessary in order to restore the SMP system to a desired and/or specified performance level.

A faulty interconnect cable can be replaced in a process that involves completely disabling and/or deconfiguring the pair of processors that the cable interconnects. An SMP processor can include both a computational portion and a portion configured to communicate with other processors and/or system resources. Both computational and communication portions of an SMP processor can be completely deconfigured to eliminate data errors or data loss across the faulty interconnect cable. However, completely deconfiguring processors can significantly reduce the computational efficiency and throughput of the entire SMP system, and in some cases can result in data transmission errors and/or system instability.

According to embodiments of the present disclosure, a faulty interconnect cable can be replaced in a process that does not involve complete deconfiguration of the interconnected processors. Upon detection of a faulty interconnect cable, the data traffic formerly allocated to the faulty cable is rerouted, through an alternate data path that includes secondary processor(s) and interconnect cable(s). Once the data traffic has been rerouted, the SMP system deconfigures only the portions of each processor involved in transmitting and receiving data across the faulty interconnect cable; the computational portion of the processor remains active. A system alert is then generated to notify a service technician or system administrator of the faulty interconnect cable.

Once the faulty interconnect cable is replaced, the replacement cable is tested by the SMP system for reliability, and the processors connected by the cable are reconfigured to transmit and receive data across the replacement cable. In embodiments, rerouting, rather than completely halting data traffic, can be useful for maintaining a relatively high level of SMP system performance during a cable replacement operation. Rerouting data traffic to an alternate data path can be useful in managing the data throughput and latency penalties associated with a faulty cable. In embodiments, during the cable replacement process, no processor of the SMP system is left without an active data bus path, i.e., interconnect cable, to its corresponding processor on another compute node. According to embodiments, the compute system can remain largely operational, with minimal impact to running programs and tasks, throughout the cable replacement process.

Certain embodiments relate to cable replacement in an operational SMP system. FIG. 1 is a block diagram depicting example interconnections between compute nodes of a fully operational and interconnected SMP computing system 100, according to embodiments of the present disclosure. FIG. 1 includes four compute nodes, compute node 1, compute node 2, compute node 3 and compute node 4, each compute node including four processors; P0, P1, P2 and P3. In some embodiments, each compute node can be housed in a replaceable, removable "drawer" unit within an SMP chassis or rack. According to embodiments, the four processors of each compute node are symmetrically interconnected by three local interconnect buses; X0, X1, and X2. The processors of each compute node are also symmetrically interconnected to processors of other compute nodes, through the buses A0, A1, and A2 and ports T1-T6 of each compute node, and through the interconnect cables of SMP interconnect fabric 102. In embodiments, the ports T1-T6 can be, for example, cable connectors or receptacles.

The symmetrical arrangement of processor interconnections provides a consistent number and diversity of interconnections between any one processor and the other processors within the SMP system. The symmetrical arrangement of interconnections between multiple processors located in multiple compute nodes can provide high-bandwidth, low-latency connections between processors, which can result in high SMP system computational throughput.

According to embodiments, each processor can be an IC, electronic module or local cluster of processing units containing one or multiple processor cores. Each processor can work independently, share data and system resources, and can be supervised by a common system-level hypervisor. In embodiments, each processor includes circuits configured to transmit data, circuits configured to receive data, and circuits configured to manage the flow of data to processors located within the same compute node or within another compute node. Each of the processors of the four compute nodes can also include cache memory.

In embodiments, each of the cables of SMP interconnect fabric 102 can include a connector at each end that is configured to connect the cable to a port, e.g., T1-T6, at one of the compute nodes. In embodiments, the interconnect cables can be configured to conduct electrical and/or optical signals. Interconnect cables can employ various numbers of electrical conductors and/or optical conducting paths, signaling protocols, and configurations i.e., unidirectional or bidirectional. According to embodiments, the interconnect cables of SMP interconnect fabric 102 may all be similar or identical to each other, in order to maintain the symmetric interconnection structure of SMP system 100. According to embodiments, each interconnect cable of SMP interconnect fabric 102 provides at least one data path between the pair of processors that it connects. The SMP system 100, as depicted in FIG. 1, is not limiting; according to embodiments, SMP systems can be designed to have a different number and/or configuration of compute nodes, processors, interconnections and connection ports than are depicted in FIG. 1.

Figure 2:
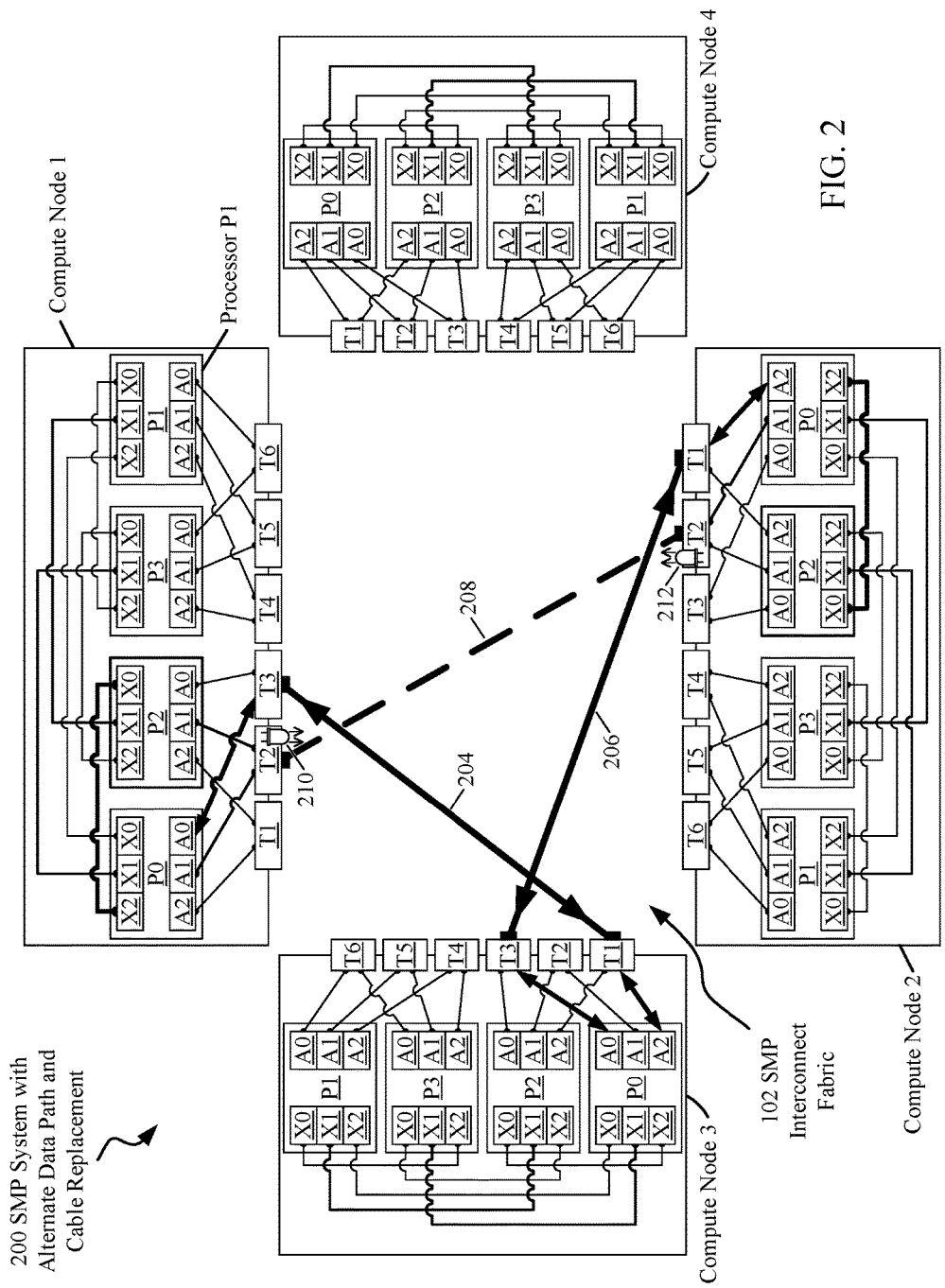
FIG. 2 is a block diagram depicting an alternate data path and cable replacement between nodes of an SMP system, according to embodiments consistent with the figures.

FIG. 2 is a block diagram depicting an alternate data path and cable replacement between compute node 1 and compute node 2 of SMP system 200, according to embodiments consistent with FIG. 1. Such an interconnect cable replacement may be initiated in response to a failed interconnect cable within SMP interconnect fabric 102.

For simplicity of illustration, some of the interconnect cables depicted in SMP interconnect fabric 102, FIG. 1, are not depicted in FIG. 2; only interconnect cables 204, 206 and 208 are shown, in order to clearly illustrate the alternate data path and cable replacement process. However, the interconnect cables of SMP interconnect fabric 102 depicted in FIG. 1 would remain connected and functional during an actual cable replacement process.

During the functional operation of an SMP system, an interconnect cable, e.g., 208, may exhibit an electrical defect. Such electrical defects can include, but are not limited to, short-circuited, open, or intermittent connections, crosstalk between adjacent conductors, excessive signal attenuation and excessive coupled electrical noise. An electrical defect in interconnect cable 208 can cause data sent between processor P2 of compute node 1 and processor P2 of compute node 2 to be lost or corrupted, resulting in a data bus/data path failure. A data bus failure may be reported by at least one of the interconnected processors to an SMP system hypervisor, which can subsequently initiate tests to verify the reliability of the interconnect cable 208.

For ease of discussion regarding interconnect paths between elements of an SMP system, compute nodes will be referred to herein as "N#", where "#" is the compute node number, e.g., compute node 1="N1". Similarly, processors will be referred to as "P#", e.g., "P1", processor buses will be referred to as "A#" and "X#", e.g., A2, X0, and compute node ports will be referred to as "T#", e.g., T4. By way of example, the A2 bus of processor P0 of compute node 4 will be referred to as "N4-P0-A2". Interconnections between elements will be denoted by an arrow, e.g., "N4-P0-X2→"N4-P2-A0".

According to embodiments, the original data path, between N1-P2 and N2-P2 over interconnect cable 208 is:
    N1-P2-A1→N1-T2→interconnect cable 208→N2-T2→N2-P2-A1

If the interconnect cable 208 is determined to be defective, the SMP system hypervisor can subsequently reroute current and pending data transfers scheduled for cable 208 to an alternate data path. According to embodiments, the alternate data path depicted in FIG. 2 is:
    N1-P2-X0→N1-P0-X2→N1-P0-A0→N1-T3→interconnect cable 204
    →N3-T1→N3-P0-A2→N3-P0-A0→N3-T3→interconnect cable 206
    →N2-T1→N2-P0-A2→N2-P0-X2→N2-P2-X0

In embodiments, the choice of interconnect cables to be included in the alternate data path is made so that no processor within the SMP system is left without an inter-node cable. Once the alternate data path is established by the SMP system hypervisor, the hypervisor disables future data transfers, e.g., between N1-P2 and N2-P2, over defective interconnect cable 208.

The data latency of the alternate data path described above may be greater than the latency through the original interconnect path including interconnect cable 208, due to the data traffic being routed over two interconnect cables, 204 and 206 between N1 and N2. As the alternate data path may involve sharing of interconnect cables 204 and 206 with current data traffic allocated to these cables, overall system data bandwidth may be reduced, and latency may be increased, accordingly. This reduction of bandwidth and increase of latency is temporary, however, until the defective interconnect cable 208 is replaced and data traffic is reallocated to a replacement cable.

Once the alternate data path is established, the hypervisor can then initiate or issue a system alert in order to identify the defective interconnect cable 208 to a service technician, so that the defective cable 208 will be replaced with a reliable replacement interconnect cable. The system alert can include illuminating light-emitting diodes (LEDs) 210 and 212, located at the T2 ports at each end of the defective interconnect cable 208. Illuminating LEDs may be useful in aiding a technician in quickly identifying the defective cable. According to embodiments, the system alert can also include a text message, email, or other sort of textual indication, to a service technician or system administrator, that the interconnect cable 208 is defective and requires replacement.

In embodiments, once the system alert is received, the defective interconnect cable 208 is replaced by a service technician or other responsible individual. The interconnect cable replacing cable 208 then provides a reliable data path between N1-P2 and N2-P2. The cable replacement and data rerouting depicted in FIG. 2 can be useful for enabling continuity of processor-to-processor interconnection during an interconnect cable failure and subsequent replacement process. Such interconnection continuity can mitigate the effects of reduced data bandwidth between SMP system processors during cable failure and replacement events.

Various embodiments of the present disclosure relate to performing a replacement of a failed SMP interconnect cable by deconfiguring cable endpoints and ensuring that during a replacement operation, no processor is left without a bus path, i.e., interconnect cable, to its corresponding processor located within another drawer of the SMP. Such a replacement process includes rerouting data traffic during the cable replacement and maintaining the SMP system functionality and performance at a high level during the repair process. According to embodiments, an SMP system undergoing such a interconnect cable replacement process can provide stable, reliable, high-performance operation for system users, without a need to deconfigure or shut down computational portions of system processors or nodes. An SMP system undergoing such a cable replacement process can provide managed/reduced system downtime and balanced, consistent computing performance, with minimal impact to running programs and tasks, throughout the cable replacement process. An SMP system repaired according to embodiments of the present disclosure can experience an improvement in Reliability, Availability, and Serviceability (RAS) over SMP systems using other methods for interconnect cable replacement.

Figure 3:
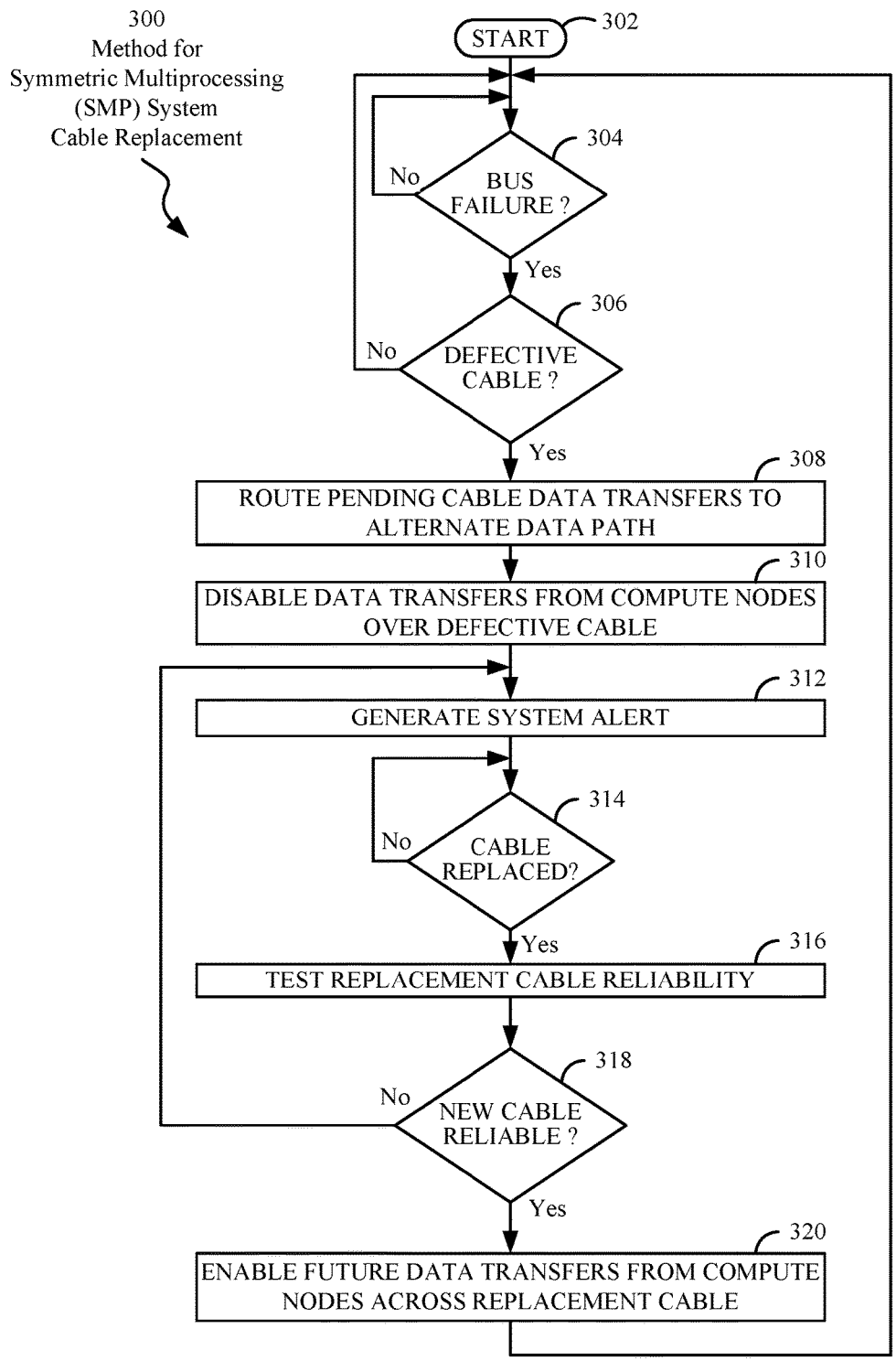
FIG. 3 is a flow diagram depicting a method for SMP cable replacement, according to embodiments consistent with the figures.

FIG. 3 is a flow diagram 300 depicting a method for SMP cable replacement, according to embodiments consistent with the figures. The operations of method 300 may generally be consistent with the depiction of an alternate data path and cable replacement provided by FIG. 2 and its associated description. The process 300 moves from start 302 to operation 304.

At operation 304 a determination is made regarding a data bus failure occurring on an SMP interconnect cable. An interconnect cable can exhibit electrical defects including, but not limited to, short-circuited, open or intermittent connections. Such defects can significantly reduce, corrupt or halt data traffic between interconnected SMP compute nodes, which can result in a data bus failure. According to embodiments, a data bus failure can be detected and reported by a processor to an SMP system hypervisor. If no bus failure is reported, the process remains at operation 304. If a bus failure is reported, the process moves to operation 306.

At operation 306, a determination is made regarding defects in an SMP interconnect cable that has experienced a bus failure detected at operation 304. According to embodiments, an SMP hypervisor can initiate and supervise reliability testing of an interconnect cable reported by a processor to have experienced a bus failure. Such cable reliability testing can include a processor, connected to one end of the interconnect cable, transmitting a known set of data patterns across the cable, to a processor receiving the data patterns at the opposite end of the cable. The transmitted and received sets of data patterns can then be compared in order to identify discrepancies or errors introduced during the transmission. Such a testing process may include the use of algorithms and techniques such as cyclic redundancy checks (CRC) and bit error rate (BER) testing.

In some embodiments, a cable reliability test or suite of such tests can be run once or multiple times in order to determine the reliability of a particular interconnect cable. In some embodiments, cable reliability test(s) can be run for a period of time that is predetermined to produce test results that are accurate within a specified statistical confidence level.

Testing an interconnect cable for defects, in response to a reported bus failure, can be useful in determining whether the interconnect cable has a detectable electrical defect which may have caused the bus failure. While bus failures can be caused by defective interconnect cables, they can also result from other causes such as the failure of a processor circuit, the failure of electrical interconnect within a compute node, or from various other causes unrelated to interconnect cable integrity.

According to embodiments, interconnect cable defect testing can be useful in confirming that a particular interconnect cable is defective, and allowing the replacement process to continue, while not proceeding with the replacement process when an interconnect cable is not confirmed as defective. In some embodiments, such a decision process could be useful in conserving SMP interconnect cables and replacement maintenance operations, while possibly redirecting the hypervisor and/or service technician towards other possible causes of a bus failure. If a cable defect is not detected, the process returns to operation 304. If a cable defect is detected, the process moves to operation 308.

Operation 308 generally refers to routing pending data transfers on the first, faulty cable to an alternate data path. According to embodiments, the SMP hypervisor can select and enable an alternate data path between the processors connected to the faulty interconnect cable, and subsequently reroute current/pending data transfers between these processors to a data path including alternate interconnect cable(s) of the SMP interconnect fabric. Such an alternate data path can be similar to and consistent with the alternate data path described in reference to FIG. 2.

In embodiments, enabling the alternate data path and rerouting data transfers can include the hypervisor supervising the affected processors in establishing new data queues and transferring currently queued data to the newly establish queues. In embodiments, an alternate data path can be useful for providing continuity of data traffic between the processors interconnected by the faulty interconnect cable. Once the pending data transfers have been routed to the alternate path, the process moves to operation 310.

Operation 310 generally refers to disabling data transfers between compute nodes across the defective cable. According to embodiments, the SMP hypervisor can supervise processors in disabling of data queues, data transmission circuitry, and any data transfer mechanism related to the faulty interconnect cable. Such disabling of queues and transfer mechanisms can be useful in preventing any further attempts at transmitting data over the faulty interconnect cable. In certain circumstances, such transmission attempts could result in lost or corrupted data, system-related errors and/or a system crash. Once data transfers from compute nodes connected to the faulty cable have been disabled, the process moves to operation 312.

Operation 312 generally refers to generating a system alert. According to embodiments, a system alert can include a notification generated by the SMP hypervisor indicating that an SMP interconnect cable has been determined to be defective and is in need of replacement. The system alert may include a text message sent to a system administrator or service technician, an entry into a service log, or other type of message intended to initiate the replacement of the defective SMP interconnect cable. In some embodiments, the system alert can include illuminating LEDs adjacent to both ends of the defective interconnect cable to indicate to a technician the particular cable requiring replacement. Illuminating LEDs adjacent to cable ends can be useful in quickly identifying and distinguishing, to a technician, a particular defective cable among several cables of the SMP interconnect fabric. Once the system alert has been generated, the process moves to operation 314.

At operation 314, a decision is made based upon the results of a detection or lack of detection of a replacement interconnect cable. In some embodiments, after a service technician or other individual replaces a defective interconnect cable with a replacement interconnect cable, the technician may inform the hypervisor of the replacement by interacting with the hypervisor through a menu, graphical user interface (GUI), or other form of user interface. In some embodiments, the SMP hypervisor may periodically initiate a continuity test between the processors coupled to each end of the defective/replaced cable in order to detect the presence of a replacement cable. The positive detection of the replacement cable can be useful in initiating a test of the replacement cable's reliability. If a replacement cable is detected, the process moves to operation 316. If the replacement cable is not detected, the process remains at operation 314.

Operation 316 generally refers to testing the reliability of the second, replacement cable. According to embodiments, the SMP hypervisor can initiate and supervise reliability tests of the replacement interconnect cable. Such cable reliability tests can be consistent with tests performed in operation 306, and can include transmitting a known set of data patterns from a processor connected to one end of the interconnect cable, across the cable, to the processor connected to the opposite end of the cable. In some circumstances, a replacement interconnect cable may either be faulty and/or maybe installed improperly, which may result in continued data bus failures. Testing a replacement interconnect cable for defects can be useful in determining whether the replacement interconnect cable has been properly installed and can be expected to perform reliably in the future. Once the reliability of the replacement cable has been tested, the process moves to operation 318.

At operation 318, a decision is made based upon the results of reliability testing of a replacement cable, performed in operation 316. The replacement cable reliability test results are compared against a predetermined reliability threshold such as number of errors per unit time. If the replacement cable reliability test results meet or exceed the reliability threshold, the process moves to operation 320. If the cable does not meet the reliability threshold, the process returns to operation 312, where a system alert can be reissued, highlighting the defective or improperly installed replacement interconnect cable. The decision made in operation 318 can be useful in preventing premature reconfiguration of data transfers between processors across a replacement cable which may be faulty or improperly installed.

Operation 320 generally refers to enabling future data transfers between the interconnected compute nodes across the replacement interconnect cable, in response to the verification of reliability of the replacement interconnect cable. In embodiments, the SMP hypervisor can supervise processors in the re-enabling of data queues, data transmission circuitry, and any data transfer mechanism related to the replacement interconnect cable. The SMP hypervisor can also supervise the disabling of the selected alternate data path formerly established in operation 308 for current/pending data transfers between the processors. In some embodiments, disabling the alternate data path and canceling the rerouting of data transfers can include transferring currently queued data to a queue corresponding to the replacement interconnect cable, and eliminating the established "alternate data path" queues.

According to embodiments, enabling data transfers across the replacement interconnect cable can be useful for restoring the high-bandwidth, low latency data bus performance that the SMP system exhibited prior to the failure of the original interconnect cable. In some embodiments, following the enabling of future data transfers across the replacement interconnect cable, the rerouting of data transfers to the alternate data path, as established in operation 308, may be removed/canceled. Once future data transfers have been enabled between across the replacement cable, the process returns to operation 304.

According to embodiments, the SMP system can include a hypervisor, run on a processor circuit within the SMP, and a secondary processor circuit, which may be referred to as a "service processor". The hypervisor is generally configured to have a supervisory/control function for the compute nodes within the SMP system, and can be configured to perform various operations as described above. In some embodiments, the service processor can be configured to perform various operations within the SMP system in conjunction with a hypervisor.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of at least one programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises at least one executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of managing compute performance of a symmetric multiprocessing (SMP) system, the SMP system including a plurality of compute nodes, each compute node of the plurality of compute nodes being physically replaceable, the plurality of compute nodes being interconnected by a plurality of cables, each cable of the plurality of cables including multiple conductors and being physically replaceable, the method comprising:

identifying as electrically defective, a first cable of the plurality of cables, the first cable including a first data path between a first compute node of the plurality of compute nodes and a second compute node of the plurality of compute nodes, the identifying including using a hypervisor to supervise a first processor of the first compute node and a second processor of the second compute node to test, for electrical defects, the first data path of the first cable;

routing, with the hypervisor, in response to the identifying, pending data transfers associated with the first data path to an alternate data path between the first compute node and the second compute node;

disabling, with the hypervisor, a first data transmission circuit located within the first processor of the first compute node and a second data transmission circuit located within the second processor of the second compute node, the first and second data transmission circuits each in electrical communication with the first cable, the disabling preventing future data transfers across the first data path;

generating, with the hypervisor, a system alert, the system alert including an indication of the first cable as defective;

testing, by using the first and second processors, in conjunction with the hypervisor, a second data path of a second cable of the plurality of cables for electrical defects, in response to the second cable being installed between the first compute node and the second compute node; and enabling, in response to the testing detecting a lack of electrical defects in the second data path, future data transfers across the second data path, by enabling, with the first and the second processors supervised by a hypervisor, the first data transmission circuit located within the first processor of the first compute node and the second data transmission circuit located within the second processor of the second compute node.

2. The method of claim 1, wherein the identifying of the first cable as defective includes testing, in response to a bus failure on the first cable, the first cable for electrical defects.

3. The method of claim 2, wherein the testing of the first cable includes comparing a set of known data patterns transmitted by the first processor into a first end of the first cable with a set of data patterns received by the second processor at a second end of the first cable.

4. The method of claim 1, wherein the testing of the second cable includes comparing a set of known data patterns transmitted by the first processor into a first end of the second cable with a set of data patterns received by the second processor at a second end of the second cable.

5. The method of claim 1, wherein generating the system alert includes illuminating light-emitting diodes (LED)s at both ends of the first cable to indicate that the first cable is defective.

6. The method of claim 1, wherein generating the system alert includes sending, with the hypervisor, to a system user, a verbal message indicating the first cable as defective.

7. The method of claim 1, further comprising, following the enabling of future data transfers across the second data path, canceling, with the hypervisor, the routing of pending data transfers associated with the first data path to the alternate data path.

8. The method of claim 1, wherein the disabling and the generating are performed by a supervisory processor circuit in conjunction with the hypervisor.

9. The method of claim 1, wherein testing the first data path of the first cable for electrical defects includes testing for defects selected from the group consisting of: electrical short circuits, electrical open circuits and electrically intermittent connections.

10. The method of claim 1, wherein testing, for electrical defects, the first data path of the first cable includes testing the first data path for a predetermined period of time that produces test results that are accurate to a specified statistical confidence level.

11. The method of claim 1, wherein disabling the first data transmission circuit and the second data transmission circuit includes supervising, with the hypervisor, the disabling of data queues located within the first processor and within the second processor.

12. A symmetric multiprocessing (SMP) system configured for automated performance management, the SMP system comprising:
   a plurality of compute nodes, each compute node of the plurality of compute nodes being physically replaceable, the plurality of compute nodes being interconnected by a plurality of cables, each cable of the plurality of cables including multiple conductors and being physically replaceable;
   a first compute node of the plurality of compute nodes having a first data transmission circuit, within a first processor, the first data transmission circuit configured to connect to, and transfer data over, a first cable of the plurality of cables;
   a second compute node of the plurality of compute nodes having a second data transmission circuit, within a second processor, the second data transmission circuit configured to connect to, and transfer data over, the first cable;
   the first cable, the first cable including a first data path;
   a second cable of the plurality of cables, the second cable including a second data path;
   a hypervisor, run on at least one processor circuit, the hypervisor configured to:
      identify as electrically defective, the first cable, the first cable including the first data path between the first compute node and the second compute node the identifying including the hypervisor supervising the first processor of the first compute node and the second processor of the second compute node to test, for electrical defects, the first data path of the first cable;
      route, in response to the identifying, pending data transfers associated with the first data path to an alternate data path between the first compute node and the second compute node;
      disable the first data transmission circuit of the first compute node and the second data transmission circuit of the second compute node, the first and second data transmission circuits each in electrical communication with the first cable, the disabling preventing future data transfers across the first data path;
      generate a system alert, the system alert including an indication of the first cable as defective;
      test, by using the first and second processors, in conjunction with the hypervisor, the second data path of the second cable for electrical defects, in response to the second cable being installed between the first compute node and the second compute node; and
      enable, in response to the testing detecting a lack of electrical defects in the second data path, future data transfers across the second data path, by enabling, with the first and the second processors supervised by the hypervisor, first data transmission circuit located within the first processor of the first compute node and the second data transmission circuit located within the second processor of the second compute node.

13. The SMP system of claim 12, wherein the first compute node and the second compute node each include respective sets of locally interconnected processors.

14. The SMP system of claim 12, wherein the first data transmission circuit of the first compute node and the second data transmission circuit of the second compute node each include respective circuits configured to transmit data, circuits configured to receive data, and circuits configured to manage the flow of data to and from the respective compute node.

15. The SMP system of claim 12, wherein the first cable and the second cable are each selected from the group consisting of: an electrical cable, an optical cable, and a hybrid electro-optical cable.

16. The SMP system of claim 12, wherein the alternate data path includes a third cable of the plurality of cables connected between a third compute node of the plurality of compute nodes and a fourth compute node of the plurality of compute nodes, the third compute node in communication with the first compute node and the fourth compute node in communication with the second compute node.

17. The SMP system of claim 12, wherein the hypervisor is configured to monitor, supervise and control the first compute node and the second compute node.

18. The SMP system claim 12, wherein disabling the first data transmission circuit and the second data transmission circuit includes supervising, with the hypervisor, the disabling of data queues located within the first processor and within the second processor.

19. The SMP system claim 12, wherein testing, for electrical defects, the first data path of the first cable, includes recording a number of errors per unit time that result from a test, and comparing the recorded number of errors per unit time against a threshold number of errors per unit time.

20. The SMP system claim 12, wherein enabling the future data transfers across the second data path includes using the hypervisor to supervise re-enabling of data queues located within the first processor and within the second processor.

* * * * *